(12) United States Patent
Ibe et al.

(10) Patent No.: US 9,539,564 B2
(45) Date of Patent: Jan. 10, 2017

(54) METHOD FOR PRODUCING EXHAUST GAS PURIFICATION CATALYST

(71) Applicants: TOYOTA JIDOSHA KABUSHIKI KAISHA, Toyota-shi, Aichi-ken (JP); THE UNIVERSITY OF TOKYO, Tokyo (JP)

(72) Inventors: Masaya Ibe, Tokyo-to (JP); Masaru Ogura, Tokyo-to (JP); Masaoki Iwasaki, Nagakute (JP); Miho Hatanaka, Nagakute (JP)

(73) Assignees: TOYOTA JIDOSHA KABUSHIKI KAISHA, Toyota (JP); THE UNIVERSITY OF TOKYO, Tokyo (JP)

(*) Notice: Subject to any disclaimer, the term of this patent is extended or adjusted under 35 U.S.C. 154(b) by 53 days.

(21) Appl. No.: 14/725,793

(22) Filed: May 29, 2015

(65) Prior Publication Data

US 2015/0343425 A1 Dec. 3, 2015

(30) Foreign Application Priority Data

May 30, 2014 (JP) .................................. 2014-112790
Jan. 6, 2015 (JP) .................................. 2015-001159

(51) Int. Cl.

| | |
|---|---|
| *B01J 29/85* | (2006.01) |
| *B01J 23/745* | (2006.01) |
| *B01J 37/08* | (2006.01) |
| *B01J 37/16* | (2006.01) |
| *B01J 37/18* | (2006.01) |
| *B01J 37/04* | (2006.01) |
| *B01D 53/94* | (2006.01) |

(52) U.S. Cl.
CPC ............... *B01J 29/85* (2013.01); *B01J 23/745* (2013.01); *B01J 37/08* (2013.01); *B01J 37/16* (2013.01); *B01J 37/18* (2013.01); *B01D 53/9418* (2013.01); *B01D 2255/50* (2013.01); *B01J 37/04* (2013.01); *B01J 2229/186* (2013.01); *B01J 2229/40* (2013.01)

(58) Field of Classification Search
CPC ......... B01J 29/85; B01J 29/763; B01J 23/745; B01J 37/04; B01J 37/08; B01J 37/16; B01J 37/18; B01J 2229/40; B01J 2229/186; B01D 53/9418; B01D 2255/50
See application file for complete search history.

(56) References Cited

U.S. PATENT DOCUMENTS

| | | | | |
|---|---|---|---|---|
| 7,645,718 | B2* | 1/2010 | Li ................. | B01D 53/9418 423/700 |
| 2009/0048095 | A1* | 2/2009 | Li ................. | B01D 53/8628 502/74 |
| 2012/0251422 | A1* | 10/2012 | Li ................. | B01D 53/9418 423/239.1 |
| 2013/0281284 | A1 | 10/2013 | Matsuo et al. | |
| 2015/0231619 | A1* | 8/2015 | Mitsui ............ | B01J 29/85 502/213 |
| 2016/0220988 | A1* | 8/2016 | Casci ............. | B01D 53/94 |

FOREIGN PATENT DOCUMENTS

| | | |
|---|---|---|
| JP | 2007-245050 A | 9/2007 |
| JP | 2012-140316 A | 7/2012 |
| JP | 2012-148272 A | 8/2012 |

\* cited by examiner

*Primary Examiner* — David M Brunsman
(74) *Attorney, Agent, or Firm* — Oliff PLC (57) ABSTRACT

A method for producing iron-supporting chabazite-type zeolite, comprising the following steps in order: mixing iron(II) chloride and chabazite-type zeolite, heat treating under a reducing atmosphere, and a Hydrogen reducing.

4 Claims, 6 Drawing Sheets

(Reference)
http://www.jaz-online.org/introduction/qanda.html

METHOD FOR PRODUCING EXHAUST GAS PURIFICATION CATALYST

TECHNICAL FIELD

The present invention relates to an exhaust gas purification catalyst, and more particularly relates to an exhaust gas purification catalyst employing chabazite-type zeolite that accomplishes catalytic reduction of nitrogen oxides.

BACKGROUND ART

When an engine carries out combustion under an oxygen excess atmosphere, the exhaust gas contains carbon monoxide, hydrocarbon and nitrogen oxides (NOx). Selective catalytic reduction (SCR) catalysts are known as catalysts that reduce the NOx which is discharged under an oxygen atmosphere, using ammonia or the like as a reducing agent.

PTL 1 describes a method for producing crystalline silicoaluminophosphate particles supporting an iron component, by spraying, drying and firing a dispersion obtained by mixing a ferrous sulfate aqueous solution and crystalline silicoaluminophosphate particles (Example 11 and elsewhere).

PTL 2 describes a nitrogen oxide purification catalyst supporting iron, cobalt, palladium, copper or the like on zeolite comprising at least silicon, aluminum and phosphorus as the skeletal structure (claim 1, paragraph [0079], and elsewhere).

PTL 3 describes a nitrogen oxide-adsorbed material supporting paramagnetic iron (III) ion on zeolite (claim 1 and elsewhere).

CITATION LIST

Patent Literature

[PTL 1] Japanese Unexamined Patent Publication No. 2012-140316
[PTL 2] Japanese Unexamined Patent Publication No. 2012-148272
[PTL 3] Japanese Unexamined Patent Publication No. 2007-245050

DISCLOSURE OF THE INVENTION

Problems to be Solved by the Invention

Cu-supporting SAPO has high NO oxidizing power, but also low selectivity for an oxidation reaction, and because $NH_3$ becomes oxidized to form NO at high temperatures, the NOx purification rate has not been high. Consequently, it has not been possible to use Cu-supporting SAPO in operating environments where the outlet temperature is high. On the other hand, existing Fe-supporting β-type zeolite has low consumption by oxidation of $NH_3$ at high temperatures, but highly active β-type zeolite generally has an unstable crystal structure, and it has therefore had low hydrothermal durability and has not satisfactorily exhibited the heat resistance required for exhaust gas catalysts (PTL 3). There has also been demand for higher activity of metals in catalysts such as iron ion, and higher heat resistance of zeolite.

Means for Solving the Problems

As a result of intensive efforts, the present inventors have found that it is possible to provide an iron-zeolite catalyst which solves the problems described above, by mixing iron(II) chloride with chabazite-type zeolite, and conducting a heat treatment step, as well as a hydrogen reduction step and oxidizing treatment step, in a reducing atmosphere to incorporate the iron into the pore sizes, and the present invention has thus been completed.

The modes of the present invention are as follows.

(1) A method for producing iron-supporting chabazite-type zeolite, comprising the following steps in order:
   a mixing iron(II) chloride and chabazite-type zeolite,
   heat treating under a reducing atmosphere, and
   a hydrogen reducing.

(2) The method according to (1), further comprising an oxidizing treatment step after the hydrogen reduction step.

(3) The method according to (1) or (2), wherein the chabazite-type zeolite is silicoaluminophosphate.

Effect of the Invention

According to the invention, it is possible to provide an iron-zeolite catalyst with high heat resistance, that not only has high activity for selective reduction of $NH_3$-NOx by Fe, but also does not oxidize $NH_3$ even at high temperatures.

It is further possible to provide an iron-zeolite catalyst with an even higher NOx purification rate even under standard SCR reaction conditions in the absence of $NO_2$, by conducting an oxidizing treatment step after the hydrogen reduction step.

BEST MODE FOR CARRYING OUT THE INVENTION

The catalyst support according to this mode of the invention may employ chabazite-type zeolite. The specific zeolite used includes silica and alumina as the main constituent elements, with phosphorus and the like as well, and it may be, for example, silicoaluminophosphate (also abbreviated as "SAPO" throughout the present specification), SSZ-13, or a mixture thereof. From the viewpoint of heat resistance, SAPO-34 is preferred.

The pore size of chabazite (CHA)-type zeolite is about 3.8 angstrom, and since it can efficiently concentrate $NH_3$ whose molecular size is smaller, either SAPO-34 or SSZ-13 may be used as the support for a selective catalytic reduction catalyst with ammonia as the reducing agent, in an excess of oxygen. In addition, if the active sites are Fe which has lower oxidizing power for $NH_3$ than Cu, then a high NOx purification rate will be obtained in the high-temperature range.

Throughout the present specification, "pore size" is the diameter of the pore, which is the diameter of a circle having the same area when the cross-sectional area of the pore is not circular.

For this mode of the invention, first in the mixing step, iron(II) chloride and chabazite-type zeolite are mixed, in amounts so that the produced catalyst will have the desired amount of iron supported, until they become visibly uniform.

The manner of mixing is not particularly restricted, and may be simple physical mixing.

The chabazite-type zeolite for this mode of the invention is not particularly restricted and may be a commercial product, and the iron chloride is also not particularly restricted and may be a commercial product.

However, a higher iron chloride content is preferred, since iron will be introduced into the pores of the chabazite-type zeolite in the subsequent steps.

For this mode of the invention, the iron(II) chloride is used at about 0.10 wt % or greater, about 0.50 wt % or greater, about 0.60 wt % or greater, about 0.70 wt % or greater, about 0.80 wt % or greater, about 0.90 wt % or greater, about 1.0 wt % or greater, about 1.1 wt % or greater, about 1.2 wt % or greater, about 1.3 wt % or greater, about 1.4 wt % or greater, about 1.5 wt % or greater, about 2.0 wt % or greater, about 2.5 wt % or greater, about 3.0 wt % or greater, about 3.5 wt % or greater or about 4.0 wt % or greater, and about 20 wt % or less, about 18 wt % or less, about 15 wt % or less, about 14 wt % or less, about 13 wt % or less, about 12 wt % or less, about 11 wt % or less, about 10 wt % or less, about 9.5 wt % or less, about 9.0 wt % or less, about 8.5 wt % or less, about 8.0 wt % or less, about 7.5 wt % or less or about 7.0 wt % or less, in terms of the metal based on the total catalyst to be produced.

According to this mode of the invention, the mixing step is followed by a heat treatment step in a reducing atmosphere.

A reducing atmosphere is an atmosphere containing no oxygen. The reducing atmosphere gas is not particularly restricted, so long as it contains no oxygen and does not react with the chabazite-type zeolite and iron(II) chloride, and the step may be carried out under a stream of nitrogen, argon or the like. It may also be actively carried out with a mixed gas combined with a reducing component such as hydrogen.

While it is not our wish to be constrained by theory, it is thought that in the heat treatment step, the mixture of chabazite-type zeolite and iron(II) chloride is fired, iron(II) chloride is taken up into the pores of the chabazite-type zeolite, as explained below, and chloride ion ($Cl^-$) is removed from the iron(II) chloride, forming divalent iron ion in the pores. It is thought that, because of the reducing atmosphere in this step, iron can be introduced into the SAPO pores in a divalent state, without being oxidized to the trivalent state.

The heat treatment step comprises first-stage heat treatment and second-stage heat treatment.

The temperature for the first-stage heat treatment may be about 100° C. or higher, about 120° C. or higher, about 140° C. or higher or about 150° C. or higher, and about 200° C. or lower, about 180° C. or lower or about 160° C. or lower, while the time may be about 2 hours or more, about 4 hours or more, about 6 hours or more, about 8 hours or more, about 10 hours or more or about 12 hours or more, and about 26 hours or less, about 24 hours or less, about 22 hours or less, about 18 hours or less, about 16 hours or less or about 14 hours or less.

The temperature for the second-stage heat treatment may be about 300° C. or higher, about 350° C. or higher, about 400° C. or higher, about 450° C. or higher or about 500° C. or higher, and about 600° C. or lower, while the time may be about 2 hours or more, about 4 hours or more, about 6 hours or more, about 8 hours or more, about 10 hours or more or about 12 hours or more, and about 26 hours or less, about 24 hours or less, about 22 hours or less, about 18 hours or less, about 16 hours or less or about 14 hours or less.

For this mode of the invention, the heat treatment step is followed by a hydrogen reduction step. The hydrogen reduction is maintenance of a prescribed temperature for a fixed time in a hydrogen stream or in a reducing stream containing hydrogen. While it is not our desire to be constrained by theory it is thought that in this step, iron is reliably converted to the divalent state and $Fe^{2+}$ ion can be disposed in stable negatively charged sites of the pores, thereby allowing a catalyst to be obtained that has high NOx purification performance even when used at high-temperature.

The temperature for the hydrogen reduction step may be about 300° C. or higher, about 350° C. or higher, about 400° C. or higher, about 450° C. or higher, about 500° C. or higher, about 550° C. or higher or about 600° C. or higher, and about 900° C. or lower, about 850° C. or lower, about 800° C. or lower, about 750° C. or lower, about 700° C. or lower or about 650° C. or lower, while the time may be 1 hour or more, about 1.5 hours or more or about 2 hours or more, and about 4 hours or less, about 3.5 hours or less, about 3 hours or less or about 2.5 hours or less.

With an iron-zeolite catalyst produced by this mode of the invention, as explained above, it is thought that iron in the $Fe^{2+}$ state becomes disposed at the ion-exchange sites of the zeolite pores after the hydrogen reduction step.

Figure 1:
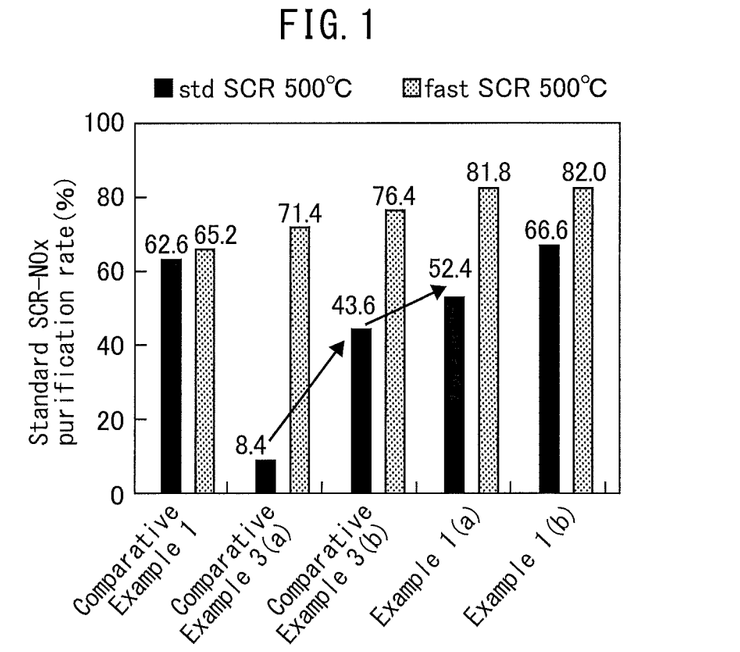
FIG. 1 is a graph plotting steady-state SCR-NOx purification rate (vol %) for the specimens of Comparative Example 1 (CuSAPO), Comparative Example 3 ($FeCl_3$) without (a) and with (b) step 1-3, and Example 1 ($FeCl_2$) without (a) and with (b) step 1-3, using Standard SCR and Fast SCR at 500° C.
Figure 3:
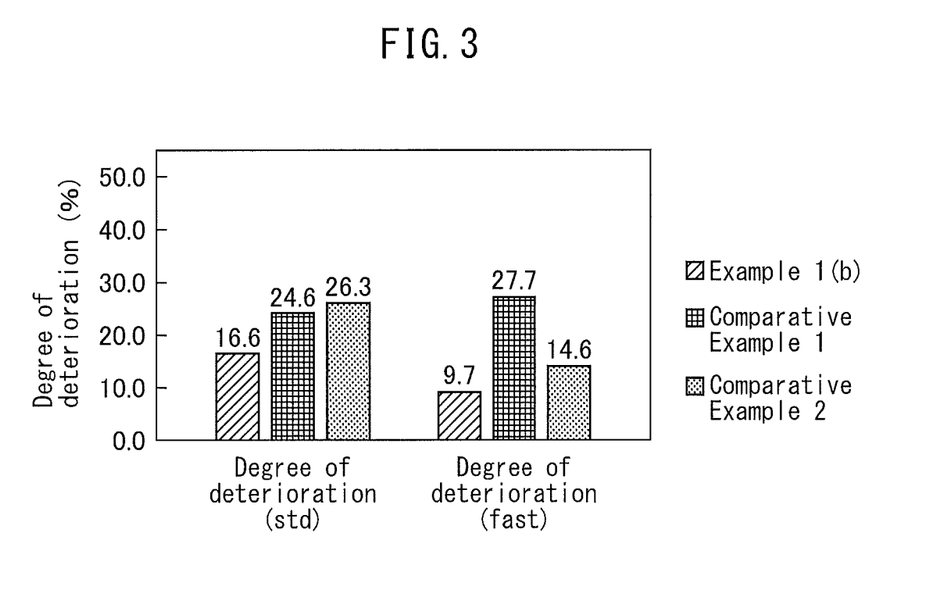
FIG. 3 is a graph showing the degree of deterioration when the steady-state SCR-NOx purification rates of the specimens of Example 1 and Comparative Examples 1 and 2 were measured at 500° C. using Standard SCR and Fast SCR, initially and after endurance evaluation.
Figure 4:
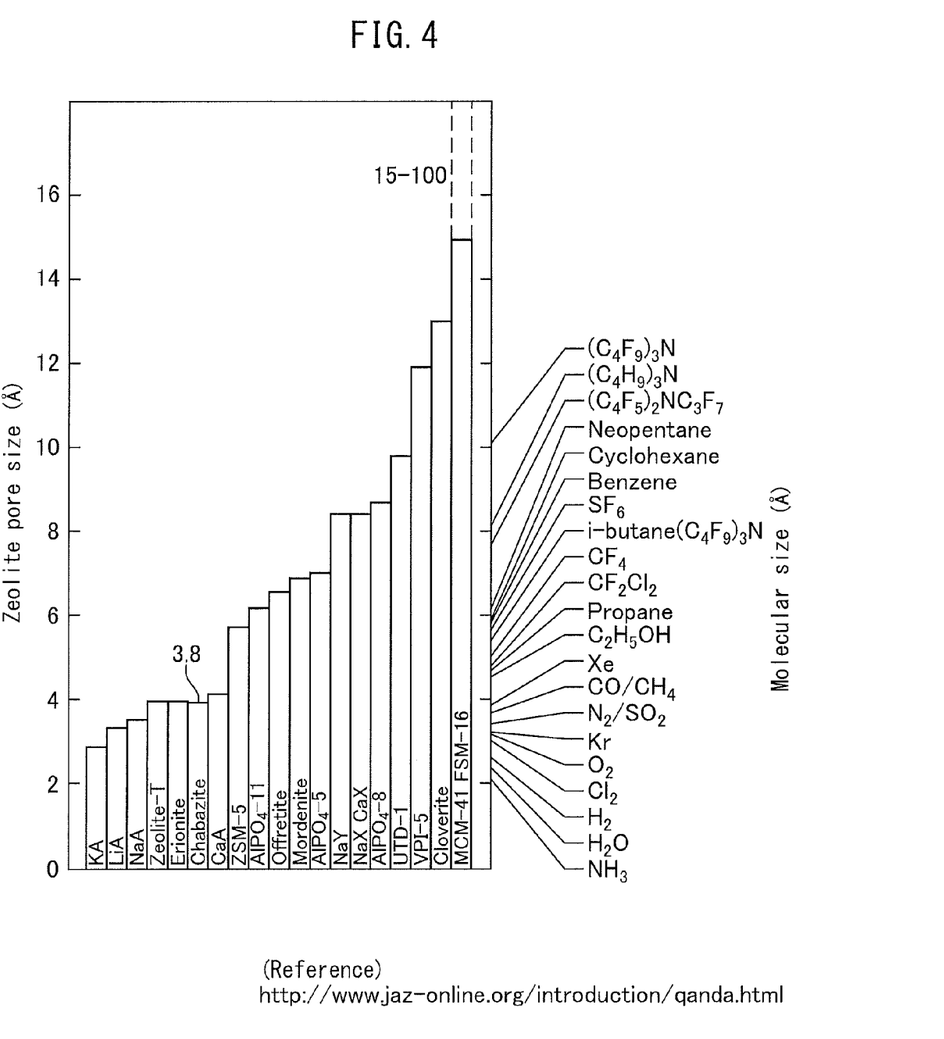
FIG. 4 is a graph showing a comparison between pore sizes and molecular sizes of different zeolites.

FIG. 1 shows cases where the zeolite is CHA-type and the active species and preparation method differ. The catalyst obtained by the method of the invention (Example 1) had higher reactivity in Fast SCR than with SAPO (Comparative Example 3) and CuSAPO (Comparative Example 1) which employed $FeCl_3$, while Example 1(b) also had higher reactivity in Standard SCR (in the absence of $NO_2$). It is seen that the use of a divalent Fe salt is more preferable than a trivalent salt, and carrying out hydrogen reduction treatment resulted in a catalyst exhibiting Standard SCR activity equivalent to that of Comparative Example 1. FIG. 3 shows that the degree of deterioration was less in Example 1(b), which exhibited durability, than in Comparative Examples 1 and 2.

Figure 2:
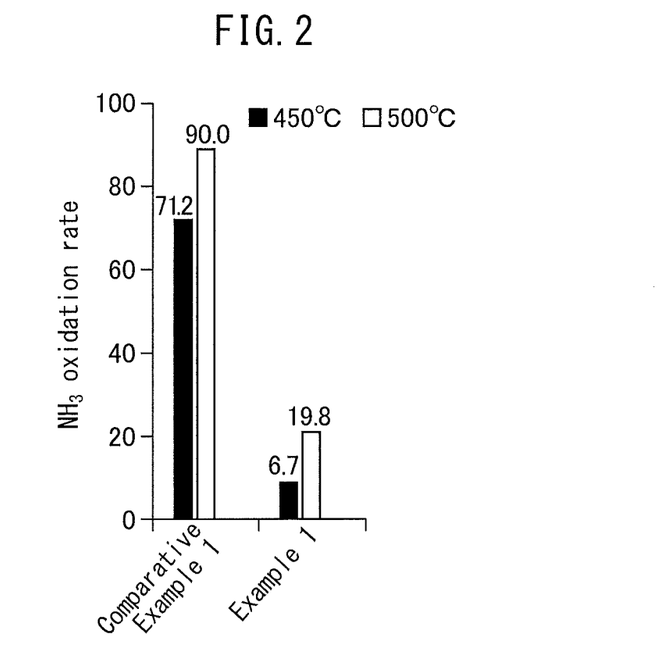
FIG. 2 is a graph plotting the measurement results for $NH_3$ oxidation rate (vol) at 450° C. and 500° C., for the specimens of Example 1 and Comparative Example 1.

Furthermore, as shown in FIG. 2, the catalyst using iron-zeolite (Example 1) was confirmed to have the advantage of a catalyst according to this mode of the invention, with much lower NO-generating rate by oxidation of $NH_3$, compared to CuSAPO (Comparative Example 1).

With a large number of functional groups, etc., iron(III) chloride has a larger molecular size than iron(II) chloride, and iron(II) chloride hydrate has a larger molecular size than iron(II) chloride. Also, it is known that iron(II) chloride di.tetra.hexahydrate decomposes when heated in air, being converted to iron(III) chloride and hydrochloric acid at 250° C. Furthermore, it is known that $Fe^{2+}$ has higher activity than $Fe^{3+}$ as a catalyst.

Consequently, while it is not our wish to be constrained by theory, it is thought that when iron(III) chloride is used, it does not easily diffuse into the pores, and in the heat treatment step, the salt decomposes outside the pores and aggregates, such that the iron does not easily undergo ion-exchange at stable sites in the pores, and the steady-state SCR-NOx purification rate is low (FIG. 1, Comparative Example 3(a)). Hydrogen reduction treatment partially promoted ion-exchange and improved the steady-state SCR-NOx purification rate, but not to the extent of Example 1 which was prepared with iron(II) chloride (FIG. 1, Comparative Example 3(b)). In addition, using β-type zeolite allows iron(II) chloride hydrate to be supported in the pores due to the large pore sizes, but the hydrothermal treatment oxidizes $Fe^{2+}$ in the pores to $Fe^{3+}$, thus making it impossible for $Fe^{3+}$ to be disposed at stable sites in the pores, resulting in cleavage of the zeolite and poor durability (FIG. 3, Comparative Example 2), and thus Example 1(b) has a lower degree of deterioration.

In contrast, while it is not our wish to be constrained by theory, with this mode of the invention it is thought that when heat treatment is carried out in an oxygen-free reducing atmosphere after iron(II) chloride has undergone solid phase ion-exchange with zeolite, the iron(II) chloride hydrate could enter into the pore sizes without being decomposed to iron(III) chloride. Also, since iron(II) chloride hydrate has a larger pore size than chabazite-type zeolite, it is presumed that according to this mode of the invention, surprisingly, when the iron(II) chloride was taken up into the pores it was taken up not as a hydrate, but could be taken up as iron(II) chloride without the hydrate. As a result, the restriction by the small pore sizes of chabazite-type zeolite presumably allowed higher activity to be achieved by $Fe^{2+}$ alone without oxidation to the larger-sized $Fe^{3+}$, even when chloride ion was removed.

Furthermore, while it is not our wish to be constrained by theory, it is thought that ion-exchange of iron that had not been sufficiently ion-exchanged by hydrogen reduction treatment proceeds subsequently, reliably keeping iron ion in the divalent state while disposing $Fe^{2+}$ in stable sites in the pores, such that the restriction of the small pore sizes of the chabazite-type zeolite prevented changes in the valency of the iron ion even during the NOx reduction reaction, thus minimizing desorption from the stable sites and resulting in improved heat resistance of the catalyst. Consequently, it is assumed that with this mode of the invention, surprisingly, it was possible to produce a catalyst having high SCR reactivity and catalyst heat resistance even at high temperature, as well as the advantage of a low ammonia oxidation rate due to using iron ion.

Thus, the method for producing a catalyst according to this mode of the invention can provide a satisfactory catalyst that entirely solves the problems of Fe/β-type zeolite catalysts that have low hydrothermal durability and large pores and thus have readily taken up hydrocarbons, and have thus been inadequate from the viewpoint of heat resistance required for exhaust gas catalysts and performance reduction due to hydrocarbon poisoning, of Cu-zeolite catalysts that, despite high oxidizing power, have had low oxidizing selectivity and have oxidized $NH_3$ in addition to NO, generating NO and lowering the purification rate, and of chabazite-type zeolite that, despite high heat resistance, has had an insufficiently high ion-exchange rate for Fe.

Furthermore, with this mode of the invention, it is possible to carry out an oxidizing treatment step after the hydrogen reduction step. Oxidizing treatment is treatment that maintains a prescribed temperature for a fixed time period, in air. While it is not our wish to be constrained by theory, it is thought that this step limits the oxidation state of iron to greater than zerovalent and less than trivalent, as will be explained in detail below, as a suitable oxidation state, thus allowing production of a catalyst with high NOx purification capacity under Standard SCR conditions.

The temperature for the oxidizing treatment step is not particularly restricted and may be about 300° C. or higher, about 350° C. or higher, about 400° C. or higher, about 450° C. or higher, about 500° C. or higher or about 550° C. or higher, and about 900° C. or lower, about 850° C. or lower, about 800° C. or lower, about 750° C. or lower, about 700° C. or lower, about 650° C. or lower or about 600° C. or lower, while the time may be about 2 minutes or more, about 4 minutes or more, about 6 minutes or more, about 8 minutes or more, about 10 minutes or more or about 12 minutes or more, and about 20 minutes or less, about 18 minutes or less, about 16 minutes or less or about 14 minutes or less.

Throughout the present specification, "oxidation state of iron" refers to the numerical value obtained by measuring an arbitrarily selected section on the specimen by X-ray Absorption Fine Structure (XAFS), obtaining an X-ray absorbed energy value when the spectral height (intensity) of the X-ray absorption near edge structure (XANES) with the intensity of X-ray absorption of the FeK edge normalized, based on transmitted light, was 0.2, and converting this value based on the measured values for Fe foil, FeO, $Fe_3O_4$, $Fe_2O_3$ and the like.

Here, the "ion-exchange rate" is the rate of exchange of $H^+$ with ions of the catalyst metal at the ion-exchange sites (acid sites) in the catalyst support, and when the catalyst metal is $Fe^{2+}$, two acid sites are exchanged with one $Fe^{2+}$, which is electrically equivalent. Specifically, the ion-exchange rate can be calculated by the formula: (number of metal ion atoms)×(metal ion valency)/(number of acid sites in catalyst support)×100. The ion-exchange rate can be adjusted to a prescribed value by adjusting the amount of Fe ion to be supported at the acid sites of the catalyst support, and it may be about 1% or more, about 5% or more, about 10% or more, about 30% or more, about 40% or more or about 50% or more, and about 100% or less, about 90% or less, about 80% or less, about 70% or less or about 60% or less.

Figure 5:
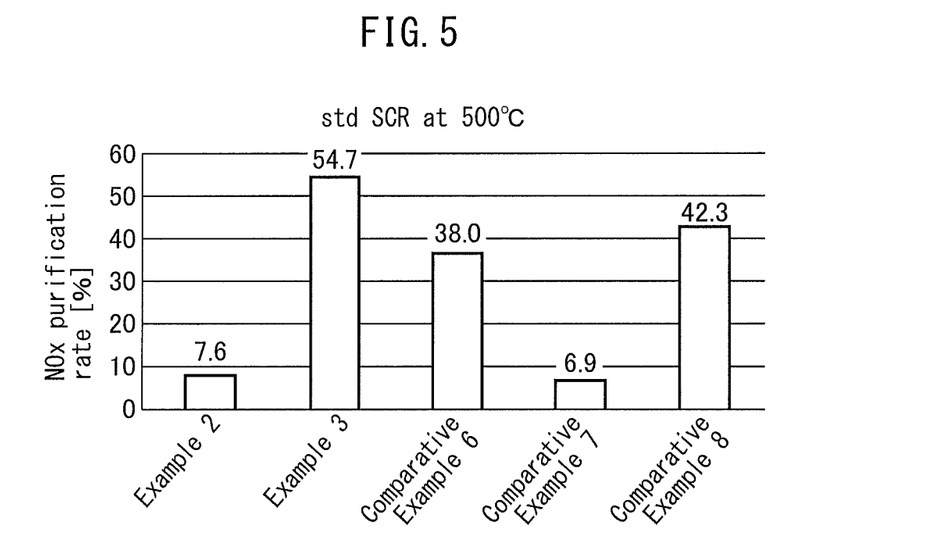
FIG. 5 is a graph plotting the measurement results for NOx purification rates (%) for the specimens of Examples 2 and 3 and Comparative Examples 6 to 8, by Std SCR at 500° C.

When a catalyst according to this mode of the invention was further subjected to an oxidizing treatment step after the hydrogen reduction step, surprisingly, as shown in FIG. 5, with an ion-exchange rate of 37%, the NOx purification rate with respect to CuSAPO which is considered to have high oxidizing power (((Example 3)/(Comparative Example 8)) was 1.29-fold, even with Std SCR in the absence of NO, and without oxidizing treatment, the NOx purification performance was slightly higher, compared to (Example 1(b))/(Comparative Example 1)=1.06-fold.

Also, although with an ion-exchange rate of 5% the NOx purification rate corresponded to the value of the ion-exchange rate (Example 2), with an ion-exchange rate of 37%, the NOx purification performance exhibited was superior to the specimen which used iron(III) chloride, without a hydrogen reduction step (Comparative Example 7).

This result demonstrated that carrying out oxidizing treatment after the hydrogen reduction step can vastly improve the purification performance, particularly when using iron (II) chloride, than when using iron(III) chloride.

Figure 6:
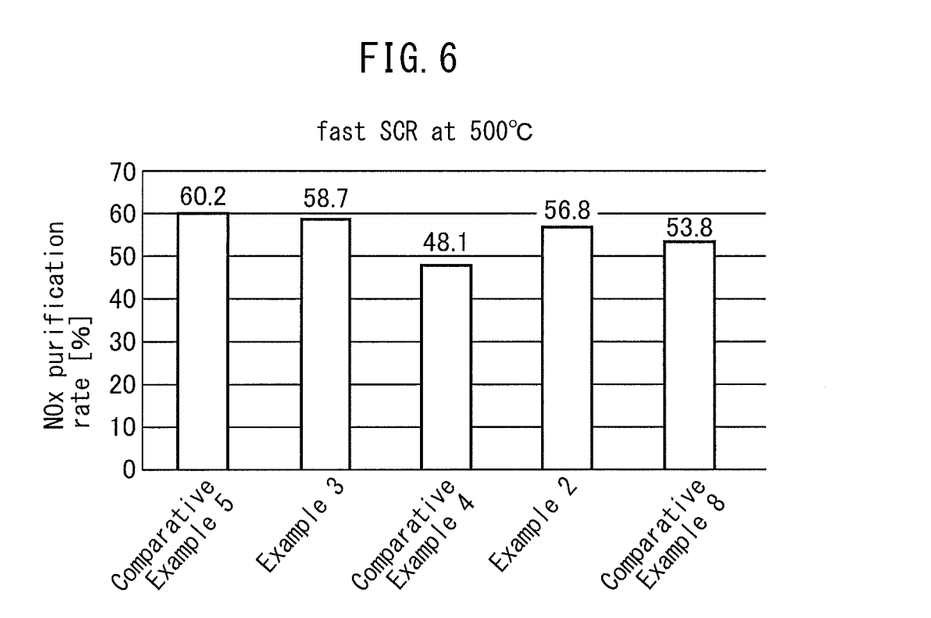
FIG. 6 is a graph plotting the measurement results for NOx purification rates (%) for the specimens of Examples 2 and 3 and Comparative Examples 4, 5 and 8, by Fast SCR at 500° C.

In addition, when the catalyst according to this mode of the invention was evaluated under Fast SCR conditions, as shown in FIG. 6, even for a specimen using iron(II) chloride with an ion-exchange rate of only 5%, approximately the same NOx purification performance was exhibited as when using CuSAPO, and iron(III) chloride (both with and without a hydrogen reduction step), which tends to have improved NOx purification performance due to the presence of $NO_2$.

Figure 8:
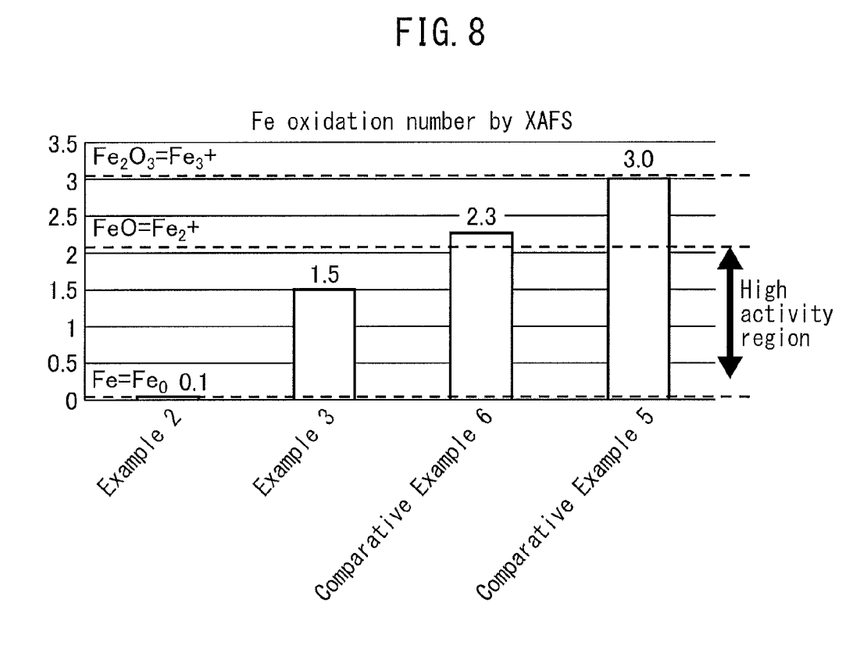
FIG. 8 is a graph plotting the measurement results for Fe oxidation number based on XAFS, for the specimens of Examples 2 and 3 and Comparative Examples 5 and 6.

When the oxidation number of Fe is calculated based on the measurement results for these catalysts according to XAFS, as shown in FIG. 8, with an ion-exchange rate of 37%, for a specimen using iron(II) chloride the value was 1.5 (Example 3) (Example 2 with an ion-exchange rate of 5% is the value of the ratio with respect to the ion-exchange rate of Example 3), which was in the range of greater than 0 and less than 2, while for a specimen using iron(III) chloride (Comparative Example 6), it was a high value of greater than 2, but even when iron(II) chloride was used, it was extremely high at 3 even without a hydrogen reduction step.

Thus, while it is not our wish to be constrained by theory, it is thought that even when $Fe^{2+}$ can be disposed in stable sites in the pores of the catalyst support, if a hydrogen reduction step is not carried out, the oxidizing treatment step appears to cause the $Fe^{2+}$ to be oxidized to $Fe^{3+}$, and conversely, even when the oxidizing treatment step was carried out after the hydrogen reduction step on $Fe^{3+}$, since $Fe^{3+}$ is not disposed in stable sites of the catalyst support in the pores, it was not possible to exhibit sufficient purification performance when evaluating the catalytic activity, even at the initial stage.

On the other hand, while it is likewise not our wish to be constrained by theory, it is thought that when oxidizing treatment is carried out after the hydrogen reduction step, with $Fe^{2+}$ disposed in stable sites in the pores, the satisfactory oxidation number of greater than 0 and 2 or less for Fe is maintained, and as mentioned above, more satisfactory NOx purification performance is exhibited than with CuSAPO under Std SCR conditions, and even with an ion-exchange rate of 5%, it was possible to exhibit NOx purification performance equivalent to other catalysts under Fast SCR conditions depending on the quality of the catalyst, regardless of the number.

Presumably, therefore, when using iron(II) chloride, it is an important condition for obtaining a suitable oxidation state for Fe, that the procedure be conducted in such a sequence that $Fe^{2+}$ is disposed in that state in stable sites in the pores of the catalyst support, a hydrogen reduction step is carried out, and an oxidizing treatment step is further carried out thereafter.

EXAMPLES

The invention will now be explained in more specific detail by examples, with the understanding that the invention is in no way limited to the examples.

Example 1

(Step 1-1: mixing step) In a mortar there were mixed 2 g of powdered $FeCl_2$ (manufacturer: Wako Pure Chemical Industries, Ltd., Model No.: 095-00912) and 7 g of SAPO (manufacturer: Mitsubishi Plastics, Inc.), at room temperature.

(Step 1-2: heat treatment step) Using a high-temperature kiln, the specimen obtained in (step 1-1) was subjected to pre-heat treatment at 150° C. for 12 hours under a nitrogen stream, and then to post-heat treatment at 500° C. for 12 hours.

(Step 1-3: hydrogen reduction step) Using a high-temperature kiln, the specimen obtained in (step 1-2) was treated at 600° C. for 2 hours under a hydrogen stream to obtain a specimen.

Comparative Example 1

Synthesis of CuSAPO

Commercially available CuSAPO by Mitsubishi Plastics, Inc. (Cu: 2.5 wt %, Si: 9 mol %) was used.

Comparative Example 2

There was used ZEOCAT PB/25 (trade name), Model No. 3089999.900.900, by the manufacturer Zeochem. The zeolite used was BEA-type, and the active species was Fe, at about 1 wt % as metal.

Comparative Example 3

Steps (step 1-2) and (step 1-3) were carried out in the same manner as Example 1, except that for (step 1-1) of Example 1 there was used $FeCl_3$ (manufacturer: Wako Pure Chemical Industries, Ltd., Model No.: 091-00872) instead of $FeCl_2$.

Evaluation of Catalytic Activity (Initial)

For the specimens of Example 1 and Comparative Examples 1, 2 and 3, a fixed bed circulating reactor was used for evaluation of the catalytic activity by (step 2-1) to (step 2-2) below, under Standard SCR (also abbreviated herein as "Std SCR") or Fast SCR reaction conditions.

For the specimens of Example 1 and Comparative Example 3, evaluation of the specimen was conducted both before treatment (a) and after treatment (b) in (step 1-3).

The catalytic amount was 1 g, and the gas flow rate was 10 liter/min.

Here, Standard SCR reaction is $4NO+4NH_3+O_2=4N_2+6H_2O$, and Fast SCR reaction is $NO+NO_2+2NH_3=2N_2+3H_2O$.

The compositions of the gases used for Standard SCR and Fast SCR were as follows, as vol % at 25° C.

TABLE 1

| | NO (ppm) | $NO_2$ (ppm) | $NH_3$ (ppm) | $O_2$ (%) | $CO_2$ (%) | $H_2O$ (%) |
|---|---|---|---|---|---|---|
| Standard SCR | 600 | 0 | 700 | 10 | 10 | 8 |
| Fast SCR | 300 | 300 | 700 | 10 | 10 | 8 |

(Step 2-1) Each specimen was treated for 5 minutes at a temperature of 550° C. using a mixed gas containing $O_2$, $CO_2$ and $H_2O$ ($O_2$, $CO_2$, $H_2O$=10%:10%:8%, as volume ratio at 25° C.), and then the Standard SCR mixed gas was used for pretreatment for 5 minutes at a temperature of 550° C.
(Step 2-2) Following (step 2-1), each specimen was treated under the following (condition 1) to (condition 4).
(Condition 1) The Std SCR mixed gas was used at 500° C. for 10 minutes.
(Condition 2) The heat treatment of (condition 1) was carried out at 400° C. for 10 minutes.
(Condition 3) The Fast SCR mixed gas was used at 500° C. for 10 minutes.
(Condition 4) The heat treatment of (condition 3) was carried out at 400° C. for 10 minutes.

The average value of the $NO_x$ purification rate from minute 9 to minute 10 during the 10 minutes of (condition 1) to (condition 4) was measured as the steady-state SCR-$NO_x$ purification rate.

As shown in FIG. 1, with Std SCR at 500° C., the values were 62.6% with the specimen of Comparative Example 1 and 8.4% without (step 1-3) (Comparative Example 3(a) in FIG. 1) and 43.6% with (step 1-3) (Comparative Example 3(b) in FIG. 1) with the specimen of Comparative Example 3, whereas with the specimen of Example 1, the values were 52.4% without (step 1-3) (Example 1(a) in FIG. 1) and 66.6% with (step 1-3) (Example 1(b) in FIG. 1).

With Fast SCR at 500° C., the values were 65.2% with the specimen of Comparative Example 1, and 71.4% without (step 1-3) (Comparative Example 3(a) in FIG. 1) and 76.4% with (step 1-3) (Comparative Example 3(b) in FIG. 1) with the specimen of Comparative Example 3, whereas with the specimen of Example 1, the values were 81.8% without (step 1-3) (Example 1(a) in FIG. 1) and 82.0% with (step 1-3) (Example 1(b) in FIG. 1).

This demonstrated that, initially, with Fast SCR including $NO_2$, whether with or without the hydrogen reduction treatment of (step 1-3), the specimens of Example 1 and Comparative Example 3, wherein the active species was Fe, had higher steady-state SCR-NOx purification rates than conventional CuSAPO (Comparative Example 1) in the high-temperature range of 500° C.

It was also demonstrated that in Example 1, even with Std SCR not including $NO_2$, carrying out the hydrogen reduction treatment of (step 1-3) increased the steady-state SCR-NOx purification rate, and resulted in high activity of 66.6% (FIG. 1, Example 1(a)), which was higher than the 62.6% of CuSAPO (Comparative Example 1).

Measurement of $NH_3$ Oxidation Rate

Following (step 2-2) described above, the specimens of Example 1 and Comparative Example 1 were measured for the $NH_3$ oxidation rate at 450° C. and 500° C. using a fixed bed circulating reactor with a mixed gas of $NH_3$ (700 ppm)+$O_2$ (10%)+$CO_2$ (10%)+$H_2O$ (8%)+$N_2$ (remainder), as the volume ratio at 25° C., with a catalyst amount of 1 g and a mixed gas flow rate of 10 liter/min.

The results demonstrated, as shown in FIG. 2, that with the specimen of Comparative Example 1, $NH_3$ was oxidized at high rates of 71.2% at 450° C. and 90.0% at 500° C., but with the specimen of Example 1, the oxidation of $NH_3$ was reduced to an extreme minimum of 6.7% at 450° C. and 19.8% at 500° C.

Evaluation of Catalytic Activity (Endurance)

The following steps were conducted for endurance evaluation.
(Step 2-3) The specimen was treated in an electric furnace at 750° C. for 24 hours in a water-bubbled air atmosphere.
(Step 2-4) (Condition 1) and (condition 3) described above were used for (step 2-2) above.

FIG. 3 shows the degree of deterioration of each catalyst, calculated from degree of change in the NOx purification rate measured in (step 2-4), before and after the endurance evaluation (step 2-3).

The degree of deterioration was calculated as [(NOx purification rate before endurance)−(NOx purification rate) after endurance)]/(NOx purification rate before endurance)×100.

It was demonstrated that Example 1(b) was resistant to deterioration, compared to a case with even the zeolite type being CHA and the active species being Cu (Comparative Example 1), and to a case with even the active species being Fe, and the zeolite type being BEA (Comparative Example 2). This demonstrated that a catalyst produced by this mode of the invention exhibits an excellent effect.
(Oxidizing Treatment Step)

In the following examples, the following conditions were used for the oxidizing treatment step when it was employed.
(Step 3-1) The specimen was placed in an electric furnace and subjected to heat treatment in air at 500° C. for 10 minutes.

Examples 2 and 3, and Comparative Example 4 to Comparative Example 6

The same procedure was carried out as in Example 1, except for (1) using the $FeCl_2$ of Example 1 or the $FeCl_3$ of Comparative Example 3 in (step 1-1), (2) conducting the treatment of (step 1-3) or not, and (3) adjusting the ion-exchange rate to 5% or 37% in Example 1, and (step 3-1) was further carried out to obtain a specimen.

The differences in the conditions (1) to (3) for Example 2 to Comparative Example 6 are summarized in the following table.

TABLE 2

|  | Example 2 | Example 3 | Comp. Example 4 | Comp. Example 5 | Comp. Example 6 | Comp. Example 7 |
|---|---|---|---|---|---|---|
| Fe starting material | 2 | 2 | 2 | 2 | 3 | 3 |
| Step 1-3 | + | + | − | − | + | − |
| Ion exchange rate (%) | 5 | 37 | 5 | 37 | 37 | 37 |

Symbols in the table: For Fe starting material, 2: using $FeCl_2$, 3: using $FeCl_3$
+: with step 1-3, −: without step 1-3.

Comparative Example 8

After adding 100 g of SAPO (manufacturer: Mitsubishi Plastics, Inc.) to 100 g of a 2.5 mass % copper acetate aqueous solution and stirring at room temperature for 10 minutes, the mixture was heated to 120° C. for evaporation to dryness to prepare a powder, and then subjected to heat treatment in air at 800° C. for 10 minutes to obtain a specimen.
Evaluation of Catalytic Activity (with Oxidizing Treatment Step, Std SCR)

The specimens of Examples 2 and 3 and Comparative Examples 6, 7 and 8 were evaluated for catalytic activity using (step 2-1) to (step 2-2) (condition 1) of the aforementioned catalytic activity evaluation (initial).

As shown in FIG. 5, the NOx purification rate was low in Example 2 and Comparative Example 7, and higher in Comparative Example 6, Comparative Example 8 and Example 3. In particular, the specimen of Example 3 exhibited a higher value than the CuSAPO of Comparative Example 8. Furthermore, even when using $Fe^{3+}$, Comparative Example 6 that had a hydrogen reduction step exhibited a higher value than Comparative Example 7 that had no hydrogen reduction step.

Evaluation of Catalytic Activity (with Oxidizing Treatment Step, Fast SCR)

The specimens of Examples 2 and 3 and Comparative Examples 4, 5 and 8 were similarly evaluated for catalytic activity using (step 2-1) to (step 2-2) (condition 3) of the aforementioned catalytic activity evaluation (initial).

As shown in FIG. 6, the $NO_2$ purification rates were found to be largely unchanged from Comparative Example 4, 5 and 8, not only in Example 3, but also in Example 2.

Evaluation of Fe Oxidation State

Figure 7:
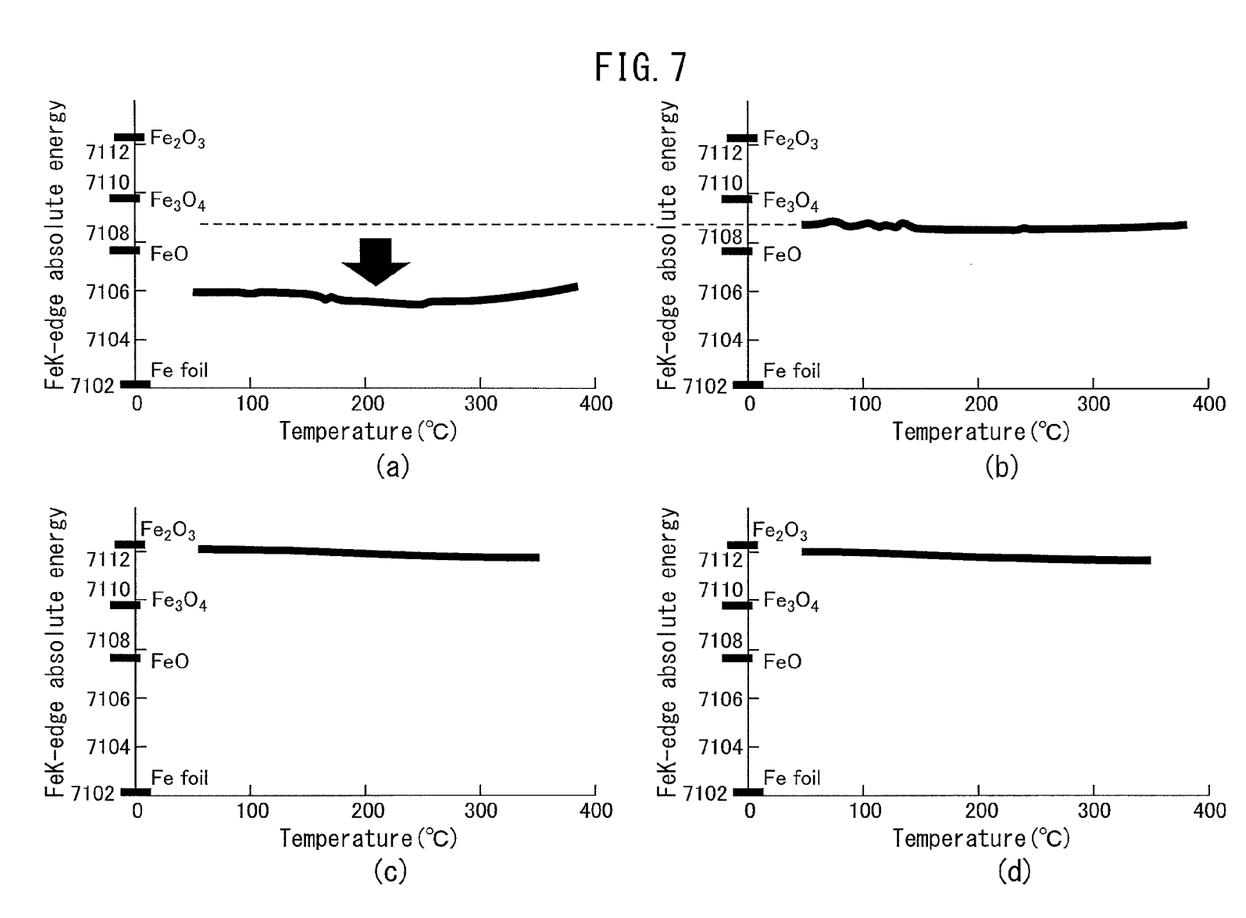
FIG. 7 is a graph showing the Fe oxidation states as the values of X-ray absorbed energy, upon measuring the absorbed energy at the FeK edges based on XAFS, normalized and at a spectrum height of 0.2 (=a result of Fe oxidation state), for (a) Example 3, (b) Comparative Example 6, (c) Comparative Example 5 and (d) Comparative Example 7.

FIG. 7 shows the results for the X-ray absorbed energy values at the FeK edges in (a) Example 3, (b) Comparative Example 6, (c) Comparative Example 5 and (d) Comparative Example 7, where the height (intensity) in the XANES spectrum normalized at the peak top is 0.2, as measured under the following measuring conditions using XAFS. (Incidentally, while it is usually common to use the value of 0.5 for the normalized spectral height for calculation of the oxidation state of a precious metal, in the case of Fe, because of a strong pre-edge peak due to the structural coordination environment that results in large variation in correlation with the oxidation state of Fe, the value of 0.5 is avoided and 0.2 is used.)

As shown in FIG. 7, the measured values were 7106 (eV) (FIG. 7(*a*)), 7108.8 (eV) (FIG. 7(*b*)), approximately 7112.2 (eV) (FIG. 7(*c*)) and approximately 7112.2 (eV) (FIG. 7(*d*)).

FIG. 8 shows the results based on the energy values of approximately 7102 (eV) with Fe foil, approximately 7107.8 (eV) with FeO, approximately 7109.8 (eV) with $Fe_3O_4$ and approximately 7112.2 (eV) with $Fe_2O_3$, measured by the same method, and converted to Fe oxidation numbers.

As shown in FIG. 8, the Fe oxidation numbers were greater than 0 and less than 2 in Example 2 and Example 3, somewhat larger than 2 in Comparative Example 6, and 3 in Comparative Example 5.

As shown by these results, conducting a hydrogen reduction step and additionally an oxygen treatment step keeps the oxidation state of iron(II) chloride in a satisfactory state, and the catalyst produced by this mode of the invention exhibits an even more excellent effect.

INDUSTRIAL APPLICABILITY

As explained above, the exhaust gas purification catalyst of the invention has satisfactory performance, with a high NOx purification rate and low production of $N_2O$, even under high temperature. The use of a reduction catalyst according to the invention, therefore, is not limited to use as an exhaust gas purification catalyst, and the catalyst may be utilized for various purposes in a wide range of fields.

What is claimed is:

1. A method for producing iron-supporting chabazite-type zeolite, comprising the following steps in order:
   mixing iron(II) chloride and chabazite-type zeolite,
   heat treating under a reducing atmosphere, and
   a hydrogen reducing.

2. The method for producing according to claim 1, further comprising an oxidizing treatment step after the hydrogen reduction step.

3. The method according to claim 1, wherein the chabazite-type zeolite is silicoaluminophosphate.

4. The method according to claim 2, wherein the chabazite-type zeolite is silicoaluminophosphate.

* * * * *